United States Patent
Haddad et al.

(10) Patent No.: US 8,325,804 B2
(45) Date of Patent: Dec. 4, 2012

(54) VIDEO ENCODING WITH INTRA ENCODING SELECTION

(75) Inventors: Julien Haddad, Paris (FR); Dominique Thoreau, Cesson Sevigne (FR); Philippe Guillotel, Vern sur Seiche (FR)

(73) Assignee: Thomson Licensing, Boulogne, Billancourt (FR)

( * ) Notice: Subject to any disclaimer, the term of this patent is extended or adjusted under 35 U.S.C. 154(b) by 707 days.

(21) Appl. No.: 12/312,117

(22) PCT Filed: Oct. 26, 2007

(86) PCT No.: PCT/EP2007/061571
§ 371 (c)(1),
(2), (4) Date: Apr. 27, 2009

(87) PCT Pub. No.: WO2008/052950
PCT Pub. Date: May 8, 2008

(65) Prior Publication Data
US 2010/0054331 A1    Mar. 4, 2010

(30) Foreign Application Priority Data
Oct. 31, 2006    (FR) ...................................... 06 54652

(51) Int. Cl.
*H04N 7/12* (2006.01)
(52) U.S. Cl. ................................. 375/240.12
(58) Field of Classification Search .............. 375/240.12
See application file for complete search history.

(56) References Cited

U.S. PATENT DOCUMENTS

| | | |
|---|---|---|
| 2005/0089235 A1 | 4/2005 | Sakagucki et al. |
| 2005/0157784 A1 | 7/2005 | Tanizawa et al. |

FOREIGN PATENT DOCUMENTS

| | | |
|---|---|---|
| EP | 1607909 | 12/2005 |
| JP | 2004304724 | 10/2004 |
| JP | 2005160048 | 6/2005 |
| JP | 2005191706 | 7/2005 |
| JP | 2006005659 | 1/2006 |

OTHER PUBLICATIONS

Tsukuba, T., Nagayoshi, I., Hanamura, T. and Tominaga, H. H.264 Fast Intra-Prediction mode decision based on Frequency Characteristic. 13th European Signal Pro. Conf., Sep. 2005.*

F. Pan et al.: "Fast Mode Decision Algorithm for Intraprediction in H.264/AVC Video Coding"; IEEE Transactions on Circuits and Systems for Video Technology, IEEE Service Center, Piscataway, NJ, vol. 15, No. 7, Jul. 2005, pp. 813-822, XP001233003.

Hung-Chih Lin et al.: "Algorithms and DSP implementation of H.264/AVC" Design Automation, 2006, Asia and South Pacific Conf. on Jan. 24, 2006, pp. 742-749, XP010901162.

(Continued)

*Primary Examiner* — Jay Patel
*Assistant Examiner* — Richard Torrente
(74) *Attorney, Agent, or Firm* — Jeffrey D. Carter

(57) ABSTRACT

The method, for the determination of the coding mode of a macroblock constituted of picture blocks, carries out a pre-selection of intra directional predictive coding modes of macroblock blocks according to the following steps:
- calculation of the activities gradient of a block in the prediction directions,
- pre-selection of intra directional coding modes of a block for which the directions correspond to the activity or activities gradient of minimum value.

9 Claims, 2 Drawing Sheets

OTHER PUBLICATIONS

Jongho Kim et al: "Complexity Reduction Algorithm for Intra Mode Selection in H.264/AVC Video Coding", Advanced Concepts for Intelligent Vision Systems Lecture Notes in Computer Science; Springer Berlin Heidelberg, BE, vol. 4179, Sep. 2006, pp. 454-465, XP019043366.

Jing-Fa Wang; et al: "A novel fast algorithm for intra mode dicision in H>264/AVC encoders", Proceedings of the IEEE Inter'l Symposium on Circuits and Systems, May 21, 2006, pp. 3498-3501, XP002444466.

Ellen L. Walker: "Class notes of the course CPSC 320-00 Computer Vision (Fall '04 12-233k), Week 5, (Smoothing & Edge Detection)", Sep. 21, 2004, pp. 1-20, XP002444467.

Jun Sung Part et al.: "Fast selective intra mode decision in H.264/AVC", Consumer Communications and Networking Conf. 2006, IEEE Las Vegas, NV, Jan. 8, 2006, pp. 1068-1072, XP010893339.

Search Report Dated Mar. 14, 2008.

Tsukuma et al., "H.264/AVC Intra-Prediction Mode Decision Based on Frequency Characteristic", ITE Technical Report, vol. 28, No. 77, 2004, pp. 61-66.

\* cited by examiner

FIG. 1 – PRIOR ART

VIDEO ENCODING WITH INTRA ENCODING SELECTION

This application claims the benefit, under 35 U.S.C. § 365 of International Application PCT/EP2007/061571, filed Oct. 26, 2007, which was published in accordance with PCT Article 21(2) on May 8, 2008 in French and which claims the benefit of French patent application No. 06 54652, filed on Oct. 31, 2006.

BACKGROUND OF THE INVENTION

The invention relates to a method for coding a sequence of pictures, specifically using the intra prediction mode.

This is in the domain of video compression for storage or transmission of data. There is particular interest in compression schemas by blocks in the context of MPEG4 type coding operations.

Figure 1:
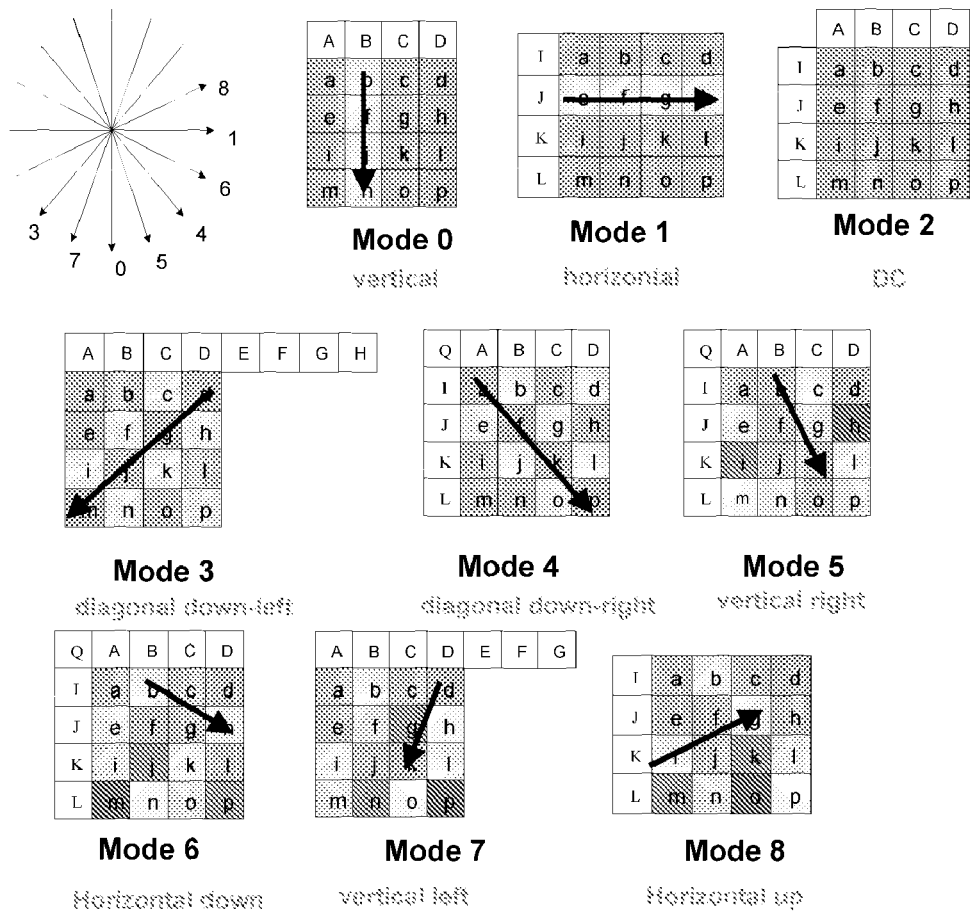

The H264/MPEG4 part 10 standard defines 9 intra prediction modes for picture blocks of dimensions 4×4, 4 lines of 4 pixels. FIG. 1 shows these different prediction modes. It also defines 4 prediction modes for 16×16 blocks, horizontal and vertical prediction modes, DC mode and plane mode carrying out a bilinear interpolation of pixel values according to the position in the line and column of the prediction pixel. For these 4 prediction modes, the DCT coefficient calculation is carried out on 4×4 sized residue blocks. The DC mode or mode 2 on FIG. 1 is also subsequently referred to as DC intra predictive coding mode, while the other modes are intra directional predictive coding modes For the MPEG 4 part 10 " high profile" version, DCT coding and prediction can also be applied to residue blocks, current blocks minus predicted blocks, of 8×8 size. Documents can be referred to describing the new tools relating to FRExt (Fidelity Range Extensions) extensions, of the video coding standard H264/MPEG4-AVC, for a more complete explanation of these modes.

The intra prediction modes make reference to the luminance values of pixels of neighbouring blocks or even of the current block for the DC mode. These prediction values, positioned at pixel locations (i, j) of the current block on which they act, constitute a prediction block, the non related locations being assigned the luminance value null. The residue block on which the discrete cosine transformation is applied is obtained, in intra prediction mode, by the difference between the current luminance block and the retained intra prediction block.

To carry out coding in intra mode, in the MPEG4 part 10 standard, a current 16×16 macroblock is cut into 4 8×8 blocks, in 16 4×4 blocks and a test of each of the intra coding modes is carried out on each of the blocks. It is also necessary to reconstruct part of the current macroblock, that which is thus being coded, to define the intra 4×4 prediction blocks, to perform this selection. A selection is carried out among the 9 prediction blocks calculated for a 4×4 block of the current macroblock according to known criteria such as coding cost and distortion to define the best prediction.

A known selection criteria is the a posteriori based bitrate/distortion criteria represented by the following equation:

$$J = sse + \lambda \cdot rate$$

with sse, sum of errors per square, λ a coefficient and <<rate>> the exact number of bits used for the coding of a block.

In this equation:

$$sse(s, r) = \sum_{i,j=0}^{N-1} (s_Y(i, j) - r_Y(i, j))^2$$

with N the size of the block to be encoded in number of lines or columns, i and j the relative indexes of the line or column of the block, $s_y$ and $r_y$ the luminance values of the current source block and of the decoded or reconstructed predicted block. y indicates that the measurements have been carried out on the luminance components.

The decision algorithm relating to the choice of intra coding for the 16×16 macroblock is relatively simple and does not require a high calculating power, the tested intra modes being applied on the single macroblock. It differs from the 4×4 and 8×8 blocks that must be reconstructed to be able to use the neighbouring blocks of the tested block. The calculation of the selection criteria of a block coding mode, that providing the best bitrate/distortion compromise, must be carried out for all the prediction modes and is therefore a very high consumer in terms of calculation time and processing time for the central processing unit. The complexity of the calculations, due in part to recursion problems, reduces the efficiency of processing circuits or requires complex circuits and is costly to implement.

One solution consists in carrying out two passes, a first pass based on an a priori criteria to select the best predictors, for example an SATD (Sum of Absolute Transform Differences) type calculation consisting in calculating, for a residue block relative to a predicted block, a transformation providing coefficients then the sum of the absolute value of these coefficients. A second pass enables refining the search using a more elaborated criteria for the modes retained in the first phase. This type of solution is however unsatisfactory as it is always necessary to test the 9 prediction modes for the 4×4 blocks and the 8×8 blocks and the economy in terms of calculation costs or processing time is limited, the processing being done in two passes. The complexity is even greater for the "high profile" version.

SUMMARY OF THE INVENTION

One of the purposes of the invention is to overcome the aforementioned disadvantages. The purpose of the invention is a coding method of a sequence of pictures using predictive intra directional coding modes privileging different prediction directions, for coding a block of a picture, characterised in that, for the determination of the coding mode of a macroblock constituted of picture blocks, it carries out a pre-selection of intra directional predictive coding modes of the blocks of a macroblock according to the following steps:
    calculation of the gradient activities of a block in the prediction directions,
    pre-selection of intra directional coding mode(s) of a block for which the directions correspond to the gradient activity or activities of minimum value.

According to a particular implementation, the pre-selection is also carried out on the intra DC predictive coding mode, a DC activity is assigned to the block which is a weighted average of gradient activities in the various prediction directions and this mode is pre-selected if the activity is less than the activity gradient of a minimum value.

According to a particular implementation, the coding modes also comprise inter picture coding modes, a non predictive intra coding mode and an intra DC predictive coding mode.

According to a particular implementation, the calculation step of the activity gradient of a block is carried out from a 2D convolution window displacing in the block.

According to a particular implementation, the convolution windows, for the different spatial directions, are as follows:

$$D_0 = \begin{bmatrix} 0 & -1 & 0 \\ 0 & 0 & 0 \\ 0 & 1 & 0 \end{bmatrix} \quad D_1 = \begin{bmatrix} 0 & 0 & 0 \\ -1 & 0 & 1 \\ 0 & 0 & 0 \end{bmatrix}$$

$$D_3 = \begin{bmatrix} 0 & 0 & -1 \\ 0 & 0 & 0 \\ 1 & 0 & 0 \end{bmatrix} \quad D_4 = \begin{bmatrix} -1 & 0 & 0 \\ 0 & 0 & 0 \\ 0 & 0 & 1 \end{bmatrix}$$

$$D_5 = \begin{bmatrix} 0 & -1 & 0 \\ 0 & 0 & 0 \\ 0 & 0 & 1 \end{bmatrix} \quad D_6 = \begin{bmatrix} 0 & 0 & 0 \\ -1 & 0 & 0 \\ 0 & 0 & 1 \end{bmatrix}$$

$$D_7 = \begin{bmatrix} 0 & -1 & 0 \\ 0 & 0 & 0 \\ 1 & 0 & 0 \end{bmatrix} \quad D_8 = \begin{bmatrix} 0 & 0 & 1 \\ -1 & 0 & 0 \\ 0 & 0 & 0 \end{bmatrix}$$

According to a particular implementation, the determination of the coding mode is carried out from a cost/distortion selection criteria.

According to a particular implementation, for coding a 16×16 macroblock, the method comprises:
- a pre-analysis step for the calculation of each of the directional energies relating to each of the 4×4 blocks and each of the 8×8 blocks of the macroblock,
- a pre-selection step of intra predictive coding modes corresponding to intra directional coding modes relative to the lowest energy levels, for each of the 4×4 blocks and for each of the 8×8 blocks,
- a selection step of intra predictive coding modes per block according to the value of a cost/distortion criteria J calculated for each of their pre-selected modes,
- a mode selection step for the macroblock according to the value of a selection criteria J calculated for the 16×16 macroblock taking into account the criteria calculated for the selected modes of blocks constituting the macroblock, the minimal value defining the positioning of the macroblock and the intra coding modes of the partitions.

According to a particular implementation, the selection criteria cost/distortion J is equal to:

$$J = sse + \lambda \cdot \text{rate}$$

with sse, sum of errors per square between the current block and the predicted block, λ a coefficient and <<rate>> the exact number of bits used for the coding of a block.

According to a particular implementation:

$$sse(s, r) = \sum_{i,j=0}^{N-1} (s_Y(i, j) - r_Y(i, j))^2$$

with N the size of the block to be encoded in number of lines or columns, i and j the relative indexes of the line and column of the block, $s_y$ and $r_y$ the luminance values of the current source block and of the decoded or reconstructed predicted block.

The invention also relates to a coding device implementing the coding method for a sequence of pictures previously described, characterised in that it comprises a pre-analysis circuit for the determination of the coding mode of a macroblock, comprising a macroblock blocks gradients calculation circuit.

The idea of the invention is to determine, for a block, the direction corresponding to the highest energy, the intra mode chosen being then for which the predicted block corresponds to this direction. In fact, the probability of having the closest prediction of the block is greater in the lowest varied information carrying direction, that is of the lowest energy level These energy levels are for example defined using gradient values.

Convolution windows are used, each window privileging one direction in the block corresponding to a direction among those relating to the intra coding modes proposed by the MPEH4 standard. These windows enable calculation of directional energies and in particular the direction having the highest energy level.

Thanks to the invention, it is no longer necessary to test all of the predictors and so carry out long and complex calculations to define an intra prediction mode.

BRIEF DESCRIPTION OF THE INVENTION

Figure 2:
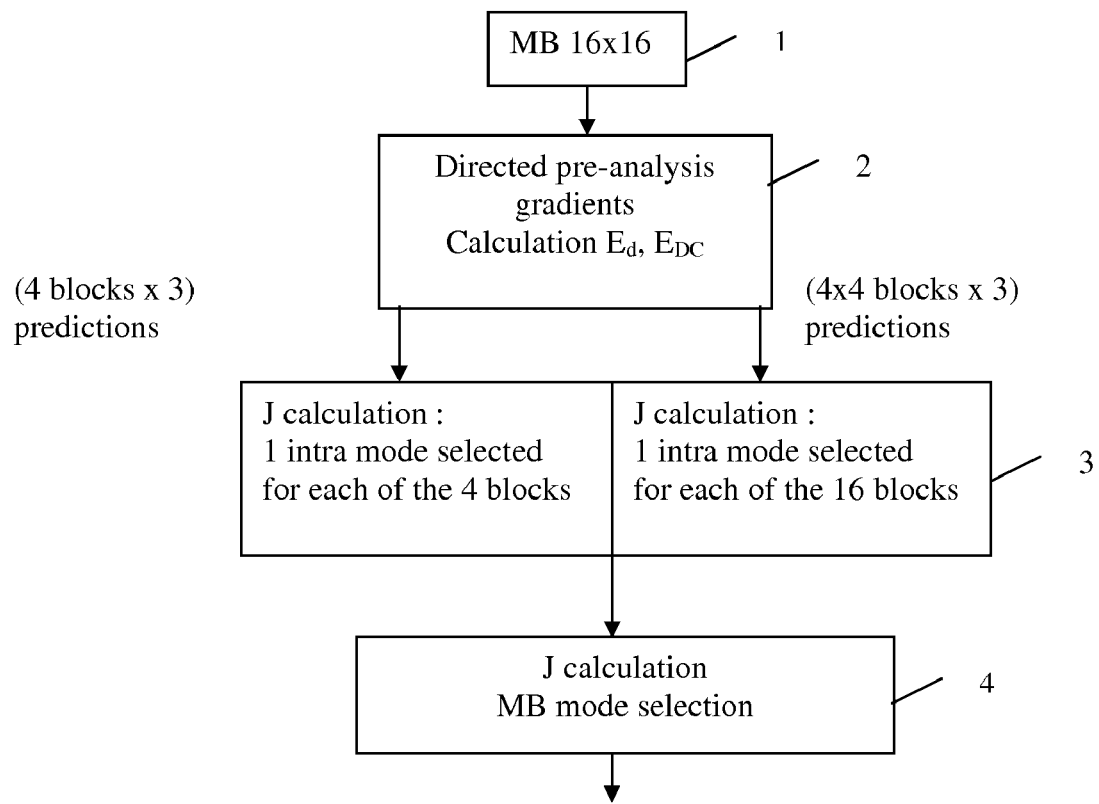

Other specific features and advantages will emerge clearly from the following description provided as a non-restrictive example and referring to the annexed drawings that show:

in FIG. 1, the different prediction modes for intra coding 4×4 blocks, in FIG. 2, a coding method flow chart.

DESCRIPTION OF THE PREFERRED EMBODIMENTS

The coding method according to the invention implements an analysis algorithm that enables reduction of the number of 4×4 and 8×8 predictors to be tested. It is based on an analysis of gradients in the different directions to determine a privileged direction of a block of pixels. To do this, one solution consists in carrying out calculations from the following matrixes. In fact it involves 8 windows or 2D convolution nodes defined according to the 8 directions previously described for the prediction of intra modes, the DC mode being excluded.

$$D_0 = \begin{bmatrix} 0 & -1 & 0 \\ 0 & 0 & 0 \\ 0 & 1 & 0 \end{bmatrix} \quad D_1 = \begin{bmatrix} 0 & 0 & 0 \\ -1 & 0 & 1 \\ 0 & 0 & 0 \end{bmatrix}$$

$$D_3 = \begin{bmatrix} 0 & 0 & -1 \\ 0 & 0 & 0 \\ 1 & 0 & 0 \end{bmatrix} \quad D_4 = \begin{bmatrix} -1 & 0 & 0 \\ 0 & 0 & 0 \\ 0 & 0 & 1 \end{bmatrix}$$

$$D_5 = \begin{bmatrix} 0 & -1 & 0 \\ 0 & 0 & 0 \\ 0 & 0 & 1 \end{bmatrix} \quad D_6 = \begin{bmatrix} 0 & 0 & 0 \\ -1 & 0 & 0 \\ 0 & 0 & 1 \end{bmatrix}$$

$$D_7 = \begin{bmatrix} 0 & -1 & 0 \\ 0 & 0 & 0 \\ 1 & 0 & 0 \end{bmatrix} \quad D_8 = \begin{bmatrix} 0 & 0 & 1 \\ -1 & 0 & 0 \\ 0 & 0 & 0 \end{bmatrix}$$

The directional energies $E_0$ to $E_8$ are calculated according to the expression:

$$E_d = \sum_{i=0,j=0}^{N-1,N-1} (Y * D_d)(i, j)$$

i and j are the indexes of pixels contained in the sub-partition or block to be encoded, Y is the luminance value d is the index corresponding to the different prediction directions, 0 to 8 represented in FIG. 1, \* is the convolution operator.

$E_d$ is therefore the summation of N×N convolutions.

For example, for the direction d=1 and for the pixel (1,1) of the current block, that is line i=1, column j=1, the calculated value is the luminance of the pixel (1,2) minus the luminance of the pixel (1,0). The set of values calculated on the block gives $E_d$. There are therefore 16 summations for the blocks of dimensions 4×4 and 64 summations for the blocks of dimensions 8×8.

Relating to inversed masks, the weakest energy value $E_d$ that thus corresponds to the lowest activity gradient in this direction d, defines the direction d and thus the predictor to be used for the intra coding calculation.

It is possible, rather than just conserve a single predictor, to select p predictors giving the lowest energy values then to test them in the standard way, to conserve only one. A first pre-selection algorithm consists in systematically pre-selecting, among these p predictors, that which corresponds to the DC mode. For example, the histogram of the picture source block giving the energy values $E_d$ of the block according to the intra prediction modes d is used while forcing the $E_2$ value to zero. The probability of selection of DC mode is in fact greater than that of other modes during the implementation of the intra coding mode decision algorithm, for example the cost/distortion optimisation algorithm known as RDO (Rate Distortion Optimization).

A good compromise between the number of calculations to be carried out and the loss engendered by a reduced choice, consists in pre-selecting modes corresponding to the 3 lowest energy levels among the 9 directions available while imposing, among the 3 modes, the DC mode. Among the 3 modes, that selected will be that giving the lowest value for the selection criteria J.

A second pre-selection algorithm consists in attributing a particular energy value to the DC mode. This chosen value is equal to the weighted average of all the modes in each direction $D_2$ excepted.

$$E_{avr} = \frac{1}{8} \sum_{d=0}^{d=8} (E_d)$$

with $d \neq 2$ $E_2 = E_{avr} \times 0{,}8125.$

This weighting, for example of a coefficient 0.8125, calculated empirically, enables favoring the DC mode when directional energies have close values, the probability of having an $E_2$ value lower than the other energies being greater. And in the case of uniform energies, that is when no clear orientation appears, the use of the DC intra predictive mode seems to be the most pertinent.

FIG. 2 shows a flow chart of the method according to the invention.

A current macroblock, of 16×16 pixels, of the picture to be coded is taken into account in step 1. A pre-analysis, step 2, is carried out on this macroblock. This pre-analysis consists in calculating the directional energies $E_d$ including the $E_{DC}$ energy, as previously indicated, on the 4 8×8 blocks and the 16 4×4 blocks comprising the macroblock.

$$E_d = \sum_{i=0,j=0}^{N-1,N-1} (Y * D_d)(i, j)$$

$$E_{DC} = (0{,}8125) \frac{1}{8} \sum_{d=0}^{d=8} (E_d)$$

with $d \neq 2$

The 2 directional prediction modes giving the lowest energy value as well as the DC mode are for example chosen for each of the blocks, that is 4×3 predictions for 8×8 size blocks and 16×3 predictions for 4×4 size blocks.

The next step 3 performs a selection criteria calculation J for each of the intra modes d retained in the preceding step, called modd. The predicted blocks relative to the different intra modes, DC mode or directional modes, are defined for example in chapter 8.5 entitled "intra prediction" of the document relating to the H264 standard and referenced ISO/IEC 14496-10 or in chapter 8.3 entitled "intra prediction process" of the ITU-T Rec document. H264 (2006). These predicted blocks are used for the selection criteria calculation. The step thus provides a J value for each of the 4 8×8 blocks and each of the 16 4×4 blocks of the macroblock.

$$J(\text{mod } d) = sse(s, pred_{modd}) + \lambda_{intra} \cdot block_{cost\ modd}$$

sse is the sum of squared errors, that is the squared differences, pixel by pixel, between the pixel luminance of the source block and the predicted block $pred_{modd}$ for mode d.

$block_{costmodd}$ corresponds to the coding cost of the block for mode d, the parameter $\lambda_{intra}$ is a predefined coefficient value enabling the coding cost and distortion to be weighted during coding in mode modd.

This step then performs a selection of d modes corresponding to the lowest value of J, in mode d for each of the 8×8 blocks and in mode d for each of the 4×4 blocks.

Step 4 which follows recovers these 4+i6 modes and the values of J associated with the selected d modes. It compares, in a first phase, the sum of the values of J of the 16 4×4 blocks to those of the 4 8×8 blocks. The intra mode chosen for the macroblock, for this first phase, that defines both the partitioning of the macroblock and the mode of blocks of the partition, is that providing the lowest value of J for the whole of the macroblock. A second phase consists in comparing the intra mode thus selected and relating to the predictions on the 4×4 or 8×8 blocks of the macroblock, with the 16×16 intra coding modes relating to the predictions on the whole of the 16×16 macroblock, to select the most efficient intra coding mode. A later step, not shown in the figure, consists in again comparing this intra coding mode with other coding modes implemented by the coder such as inter type coding modes, for the final choice of coding mode for the macroblock.

It would of course also be possible to process the 16×16 intra predictive coding mode of the macroblock from the convolution windows thus at the same time the 4×4 and 8×8 intra predictive coding modes, using the windows corresponding to the horizontal and vertical directions in the case where only these directions are used, that is in the "high profile" version of the standard. The plane mode can be processed separately, for example by weighting the sum of energy levels in the horizontal and vertical directions but in a way lesser than for the DC mode.

The invention also relates to a coding device implementing the coding method previously described. This device comprises a pre-analysis circuit for the determination of the intra coding mode of a macroblock. This circuit comprises the means for calculation of macroblock block gradients to carry out the calculations of block gradient activities in the different directions. The pre-selected pre-analysis circuit, for each block, for example the 2 intra directional modes providing the lowest gradient activity as well as the intra DC mode. It performs a standard calculation based on the cost/distortion criteria for these pre-selected modes, to determine the intra mode of the macroblock to be compared with other modes implemented by the coder.

The invention has been described for 4×4 and 8×8 blocks constituting a 16×16 macroblock. It applies however to all block types whose size corresponds to one of the block sizes selected for the definition of predictive intra directional coding modes. The invention can just as well be applied to luminance blocks as to chrominance blocks.

The applications relate to data compression, the standards concerned are the MPEG4 part 10 standard and all future standards using predictive intra directional coding mode.

The invention claimed is:

1. Method for coding a sequence of pictures using predictive intra directional coding modes privileging different prediction directions, for coding a block of a picture, wherein for the determination of the coding mode of a macroblock constituted of picture blocks, the method carries out a pre-selection of intra directional predictive, or DC predictive coding modes of the blocks of a macroblock according to steps comprising:
- calculation of gradient activities of a block in the prediction directions,
- calculation of DC activity of a block that is a weighted average of the gradient activities in the different prediction directions for the block,
- pre-selection of intra directional coding mode(s) of a block for which the directions correspond to the gradient activity or activities of minimum value if the DC activity is higher than the minimum gradient activity or activities or pre-selection of the DC predictive mode in the contrary case.

2. Method according to claim 1, wherein the coding modes also comprise inter picture coding modes, a non predictive intra coding mode and an intra DC predictive coding mode.

3. Method according to claim 1, wherein the calculation step of the activity gradient of a block is carried out from a 2D convolution window displacing in the block.

4. Method according to claim 3, wherein the convolution windows D0, D1, D2, D3, D4, D5, D6, D7 and D8, for the different prediction directions, are as follows:

$$D_0 = \begin{bmatrix} 0 & -1 & 0 \\ 0 & 0 & 0 \\ 0 & 1 & 0 \end{bmatrix} \quad D_1 = \begin{bmatrix} 0 & 0 & 0 \\ -1 & 0 & 1 \\ 0 & 0 & 0 \end{bmatrix}$$

$$D_3 = \begin{bmatrix} 0 & 0 & -1 \\ 0 & 0 & 0 \\ 1 & 0 & 0 \end{bmatrix} \quad D_4 = \begin{bmatrix} -1 & 0 & 0 \\ 0 & 0 & 0 \\ 0 & 0 & 1 \end{bmatrix}$$

$$D_5 = \begin{bmatrix} 0 & -1 & 0 \\ 0 & 0 & 0 \\ 0 & 0 & 1 \end{bmatrix} \quad D_6 = \begin{bmatrix} 0 & 0 & 0 \\ -1 & 0 & 0 \\ 0 & 0 & 1 \end{bmatrix}$$

$$D_7 = \begin{bmatrix} 0 & -1 & 0 \\ 0 & 0 & 0 \\ 1 & 0 & 0 \end{bmatrix} \quad D_8 = \begin{bmatrix} 0 & 0 & 1 \\ -1 & 0 & 0 \\ 0 & 0 & 0 \end{bmatrix}$$

5. Method according to claim 1, wherein the determination of the coding mode is carried out from a cost/distortion selection criteria.

6. Procedure according to claim 1, for the coding of a 16×16 macroblock, comprising:
- a pre-analysis step for the calculation of each of the directional energies relating to each of the 4×4 blocks and each of the 8×8 blocks of the macroblock,
- a pre-selection step of intra predictive coding modes corresponding to intra directional coding modes relative to the lowest energy levels, for each of the 4×4 blocks and for each of the 8×8 blocks,
- a selection step of intra predictive coding modes per block according to the value of a cost/distortion criteria J calculated for each of their pre-selected modes,
- a mode selection step for the macroblock according to the value of a selection criteria J calculated for the 16×16 macroblock taking into account the criteria calculated for the selected modes of blocks constituting the macroblock, the minimal value defining the positioning of the macroblock and the intra coding modes of the partitions.

7. Method according to claim 5, wherein the cost/distortion selection criteria J is equal to:

$$J = sse + \lambda \text{rate}$$

with sse, sum of errors per square between the current block and the predicted block, $\lambda$ a coefficient and <<rate>> the exact number of bits used for the coding of a block.

8. Method according to claim 6, comprising:

$$sse(s, r) = \sum_{i,j=0}^{N-1} (s_Y(i, j) - r_Y(i, j))^2$$

with N the size of the block to be encoded in number of lines or columns, i and j the relative indexes of the line and column of the block, $s_y$ and $r_y$ the luminance values of the current source block and of the decoded or reconstructed predicted block.

9. Coding device for implementing the method according to claim 1, comprising a pre-analysis circuit for the determination of the coding mode of a macroblock, itself comprising a calculation circuit of block gradients of a macroblock and of a DC activity of the block which is a weighted average of gradient activities in the different prediction directions for the block.

* * * * *